United States Patent
Zhao

(10) Patent No.: US 8,661,372 B1
(45) Date of Patent: Feb. 25, 2014

(54) OPTICAL PROXIMITY CORRECTION METHOD

(71) Applicant: United Microelectronics Corp., Hsin-Chu (TW)

(72) Inventor: Jie Zhao, Singapore (SG)

(73) Assignee: United Microelectronics Corp., Science-Based Industrial Park, Hsin-Chu (TW)

( * ) Notice: Subject to any disclaimer, the term of this patent is extended or adjusted under 35 U.S.C. 154(b) by 0 days.

(21) Appl. No.: 13/757,856

(22) Filed: Feb. 4, 2013

(51) Int. Cl.
*G06F 17/50* (2006.01)

(52) U.S. Cl.
USPC .............................................. 716/53; 716/52

(58) Field of Classification Search
USPC ................................................... 716/50–55
See application file for complete search history.

(56) References Cited

U.S. PATENT DOCUMENTS

| | | | |
|---|---|---|---|
| 6,033,811 A | 3/2000 | Lee | |
| 6,395,438 B1 | 5/2002 | Bruce | |
| 6,470,489 B1 | 10/2002 | Chang | |
| 6,684,382 B2 | 1/2004 | Liu | |
| 6,753,115 B2 | 6/2004 | Zhang | |
| 6,763,514 B2 | 7/2004 | Zhang | |
| 6,852,453 B2 | 2/2005 | Wu | |
| 6,961,920 B2 | 11/2005 | Zach | |
| 7,386,829 B2 | 6/2008 | Lee | |
| 7,624,369 B2 | 11/2009 | Graur | |
| 7,742,162 B2 | 6/2010 | Tsutsui | |
| 2002/0047089 A1* | 4/2002 | Tounai et al. | 250/221 |
| 2004/0170905 A1* | 9/2004 | Liebmann et al. | 430/5 |
| 2005/0044522 A1* | 2/2005 | Maeda | 716/18 |
| 2006/0066339 A1 | 3/2006 | Rajski | |
| 2006/0085772 A1 | 4/2006 | Zhang | |
| 2006/0161452 A1 | 7/2006 | Hess | |
| 2009/0193385 A1 | 7/2009 | Yang | |
| 2009/0278569 A1 | 11/2009 | Taoka | |
| 2009/0300576 A1 | 12/2009 | Huang | |
| 2010/0036644 A1 | 2/2010 | Yang | |
| 2010/0070944 A1 | 3/2010 | Wu | |
| 2010/0086862 A1 | 4/2010 | Yang | |
| 2010/0131914 A1 | 5/2010 | Wu | |
| 2010/0175041 A1 | 7/2010 | Krasnoperova | |
| 2010/0232679 A1 | 9/2010 | Naoe | |
| 2011/0029939 A1 | 2/2011 | Yang | |

* cited by examiner

*Primary Examiner* — Binh Tat
(74) *Attorney, Agent, or Firm* — Winston Hsu; Scott Margo

(57) ABSTRACT

The present invention provides an OPC method. First, a mask pattern is provided. A first region and a second region are detected in the mask pattern. The mask pattern comprises at least a first pattern in the first region and a second pattern in the second pattern, and the first pattern with a first width, a first gap with a first space, the second pattern with a second width and a second gap with a second space are disposed in sequence, wherein the second space value is substantially 2.5 to 3.5 times the value of the first width. Then, a modification process is performed by changing the arrangement of the mask pattern thereby making the mask pattern become a revised pattern, so the first pattern is not influenced by light passing through the second gap during an exposure process. Finally, the revised pattern is outputted onto a mask.

10 Claims, 5 Drawing Sheets

OPTICAL PROXIMITY CORRECTION METHOD

BACKGROUND OF THE INVENTION

1. Field of the Invention

The present invention relates to an optical proximity correction method, and more particularly, to an optical correction method which is used to decrease the phenomenon of light diffraction during an exposure process.

2. Description of the Prior Art

In semiconductor manufacturing processes, in order to transfer an integrated circuit layout onto a semiconductor wafer, the integrated circuit layout is first designed and formed as a photo-mask pattern. The photo-mask pattern is then proportionally transferred to a photoresist layer positioned on the semiconductor wafer.

In recent years, with the increasing miniaturization of semiconductor devices, the design rule of line width and space between lines or devices has become finer. However, the width is subject to optical specificities. To obtain fine-sized devices during the exposure, the interval between transparent regions in a mask is scaled down with device size. In order to improve a dimensional precision of device patterns, optical proximity correction (OPC) techniques have been developed. OPC is a correction technique in which the pattern arrangement is changed so as to obtain desired patterns on the substrate. Along with the increasing degrees of miniaturization and integration of the device patterns, more and more OPC techniques are developed.

SUMMARY OF THE INVENTION

The present invention provides an OPC method that can avoid the peeling problem resulting from light diffraction.

According to one embodiment of the present invention, an OPC method is provided. First, a mask pattern is provided. A first region and a second region are detected in the mask pattern, wherein the first region and the second region are adjacent to each other. The mask pattern comprises at least a first pattern in the first region and a second pattern in the second region. The first pattern having a first width, a first gap with a first space, and the second pattern having a second width and a second gap with a second space are disposed in sequence, wherein the second space is substantially 2.5 to 3.5 times the value of the first width. Then, a modification process is performed by changing the arrangement of the mask pattern and changing the mask pattern into a revised pattern. Lastly, the revised pattern is outputted onto a mask.

Through the modification that changes the arrangement of the mask pattern, the second space is not 2.5 to 3.5 times the value of the first width anymore, so the light diffraction phenomenon from the second gap can be prevented.

These and other objectives of the present invention will no doubt become obvious to those of ordinary skill in the art after reading the following detailed description of the preferred embodiment that is illustrated in the various figures and drawings.

DETAILED DESCRIPTION

To provide a better understanding of the presented invention, preferred embodiments will be described in detail. The preferred embodiments of the present invention are illustrated in the accompanying drawings with numbered elements.

Figure 1:
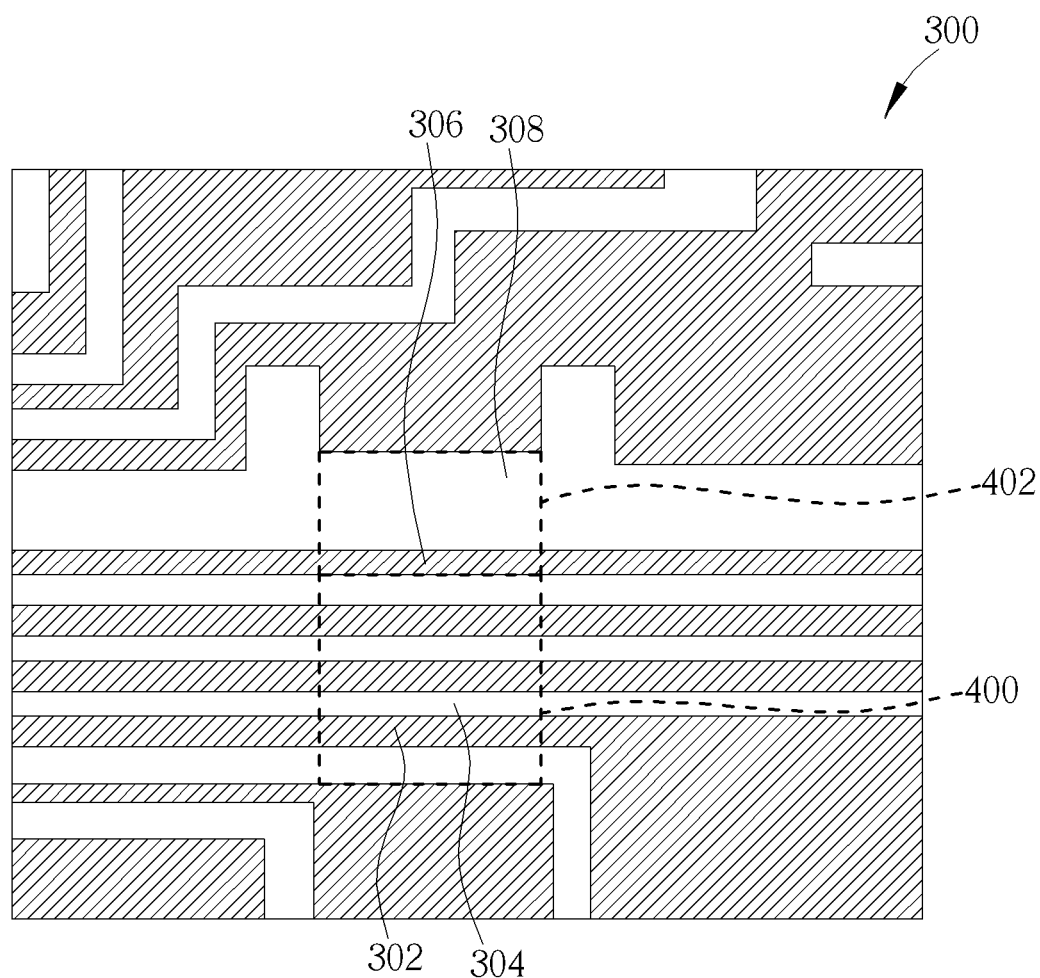
FIG. 1 is a schematic diagram of the OPC method according to one embodiment of the present invention.

Please refer to FIG. 1, which is a schematic diagram of the OPC method according to one embodiment of the present invention. As shown in FIG. 1, a mask pattern 300 is provided. The mask pattern 300 refers to the final pattern which will be formed on the semiconductor photoresist layer (not shown) in the following steps and reflects the layout of the electrical circuit. According to the degree of density, at least a first region 400 and at least a second region 402 are defined on the mask pattern 300, wherein the first region 400 and the second region 402 do not overlap each other and are adjacent to each other. Preferably, the first region 400 is a dense region which has a larger pattern density per unit area and the second region 402 is an isolation region which has a smaller pattern density per unit. In the first region 400, the mask pattern 300 includes a plurality of first patterns 302, which have stripe shapes or rectangular shapes and are parallel to each other. At least a first gap 304 is disposed between every two first patterns 306 such that the first patterns 302 and the first gaps 304 are arranged alternatively. In the second region 402, the mask pattern 300 includes a second pattern 306. Preferably, the second pattern 306 is adjacent to the boundary between the first region 400 and the second region 402. A second gap 308 is adjacent to the second pattern 306.

Figure 2:
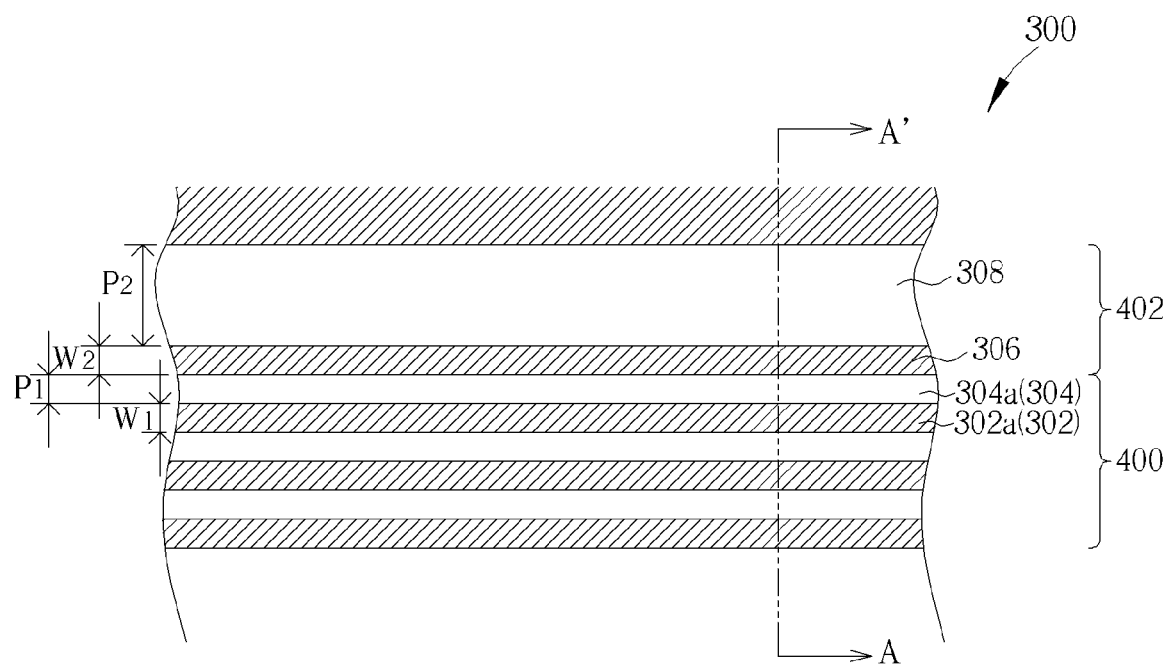
FIG. 2 is an enlarged diagram of the first region and the second region.

Please refer to FIG. 2, which is an enlarged diagram of the first region and the second region. As shown in FIG. 2, among the first patterns 302 and the first gaps 304, the first pattern 302a and the first gap 304a are the closest ones to the second pattern 306 so the first pattern 302a, the first gap 304a, the second pattern 306 and the second gap 308 are arranged in sequence. The first pattern 302a has a first width W1, the first gap 304a has a first space P1, the second pattern 306 has a second width W2 and the second gap 308 has a second space P2. In one embodiment, the first width W1 is equal to the first space P1. Among current L65, L60 or L55 generation exposure system for forming metal interconnection systems, the first width W1 and the first space P1 are about 90 nanometers (nm) for example. In one embodiment, the second width W2 is equal or larger than the first width W1, for example, 90 nm. In one embodiment, the second space P2 is about 2.5 to 3.5 times the value of the first width W1, for example, between 280 and 320 nm.

Figure 3:
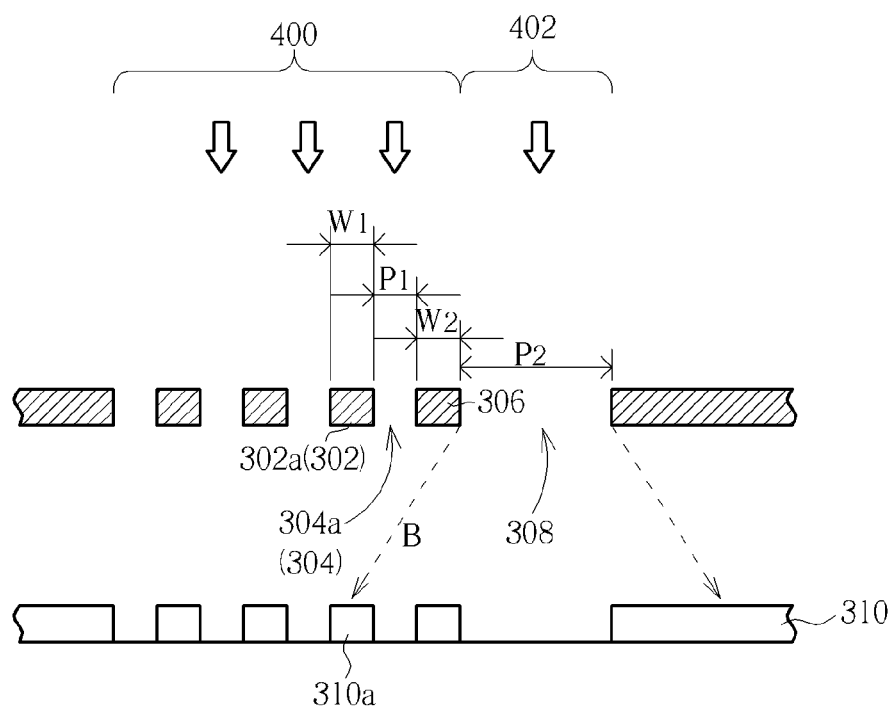
FIG. 3 shows an exposure step that uses the mask pattern as a mask

Please refer to FIG. 3, which shows an exposure step when using the mask pattern as a mask, wherein FIG. 3 is a cross-sectional view taken along line AA' in FIG. 2. As shown in FIG. 3, during the exposure step, light passes through the first gaps 304 and the second gap 308 to pattern a photoresist layer 310. The photoresist layer 310 therefore has a pattern corresponding to the mask pattern 300. However, because of the light diffraction phenomenon (marked by arrow B), the photoresist layer 310a is influenced by the light passing through the second gap 308, resulting in a pattern peeling problem. It is observed that the pattern peeling problem is serious when the second space P2 is about 2.5 to 3.5 times the value of the first width W1, especially 3 times of the first width W1.

Figure 4:
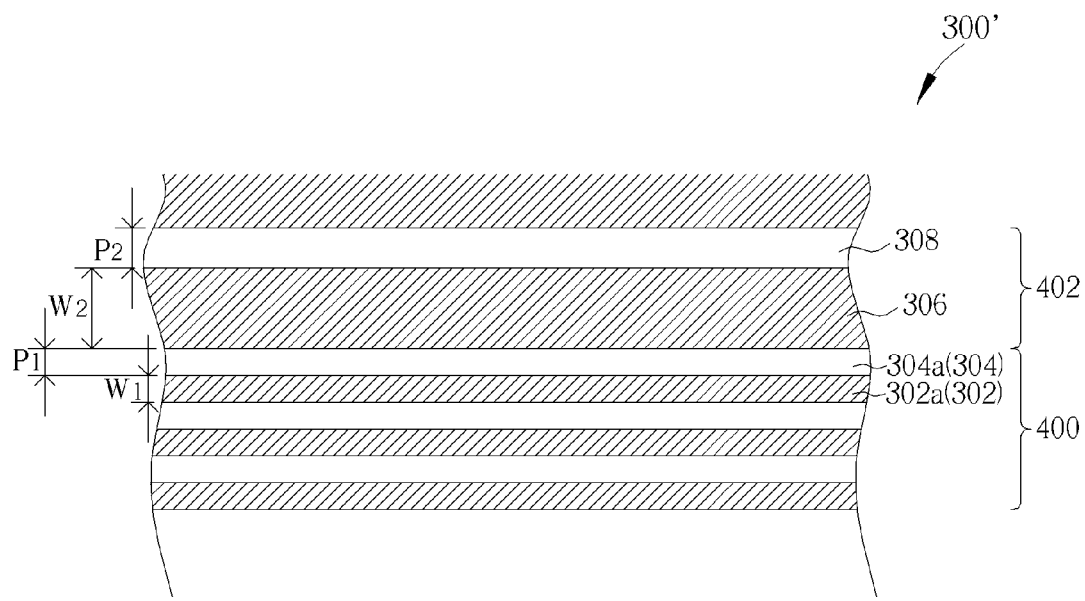
FIG. 4 to FIG. 7 show schematic diagrams of the step of the modification process according to the first, the second, the third and the fourth embodiment of the present invention.
Figure 5:
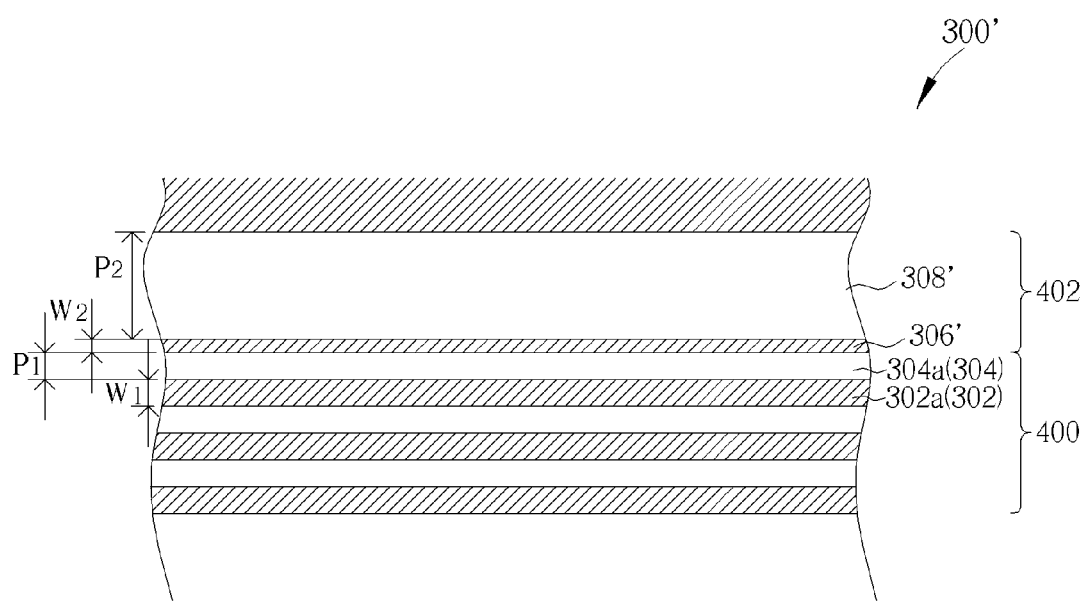
Figure 6:
Figure 7:

In order to avoid the pattern peeling problem, the OPC method of the present invention includes a modification process for the mask pattern to change the arrangement of the mask pattern. FIG. 4 to FIG. 7 show schematic diagrams of the modification process step according to the first, the second, the third and the fourth embodiment of the present invention. As shown in FIG. 4, the modification process includes reducing the size of the second space P2 and enlarging the second width W2. For example, the second space P2 is adjusted from 300 nm to 180 nm and the second width W2 is adjusted from 90 nm to 210 nm. In this embodiment, the area of the second region 402 is not changed. In another embodiment, as shown in FIG. 5, the modification process includes enlarging the second space P2 and narrowing the second width W2. For example, the second space P2 is adjusted from 300 nm to about 345 nm and second width W2 is adjusted from 90 nm to 45 nm. In this embodiment, the area of the second region 402 is not changed. In another embodiment, as shown in FIG. 6, the area of the second region 402 and the area of the first region 400 are modified. For example, the mask pattern 300' in the first region 400, including the plurality of the first patterns 302, is removed toward the second region 400. That is, the first patterns 302 are shifted in a direction toward the second pattern 306. The first space P1 is reduced but the second width W2 and the second space P2 remain the same. In still another embodiment, as shown in FIG. 7, the modification process includes increasing the first width W1. For example, the first width W1 is increased from 90 nm to about 135 nm. The first space P1, the second width W2 and the second space P2 remain the same.

It is noted that the above embodiments can be alternatively combined. For example, the modification process can include increasing the second space P2, as shown in FIG. 5 and further increasing the first width W1, as shown in FIG. 7. It is understood that the OPC method can be combined with other OPC methods as well.

After the modification process, the mask layer 300 becomes a revised layer 300'. Thereafter, the revised pattern is output onto a mask.

Figure 8:
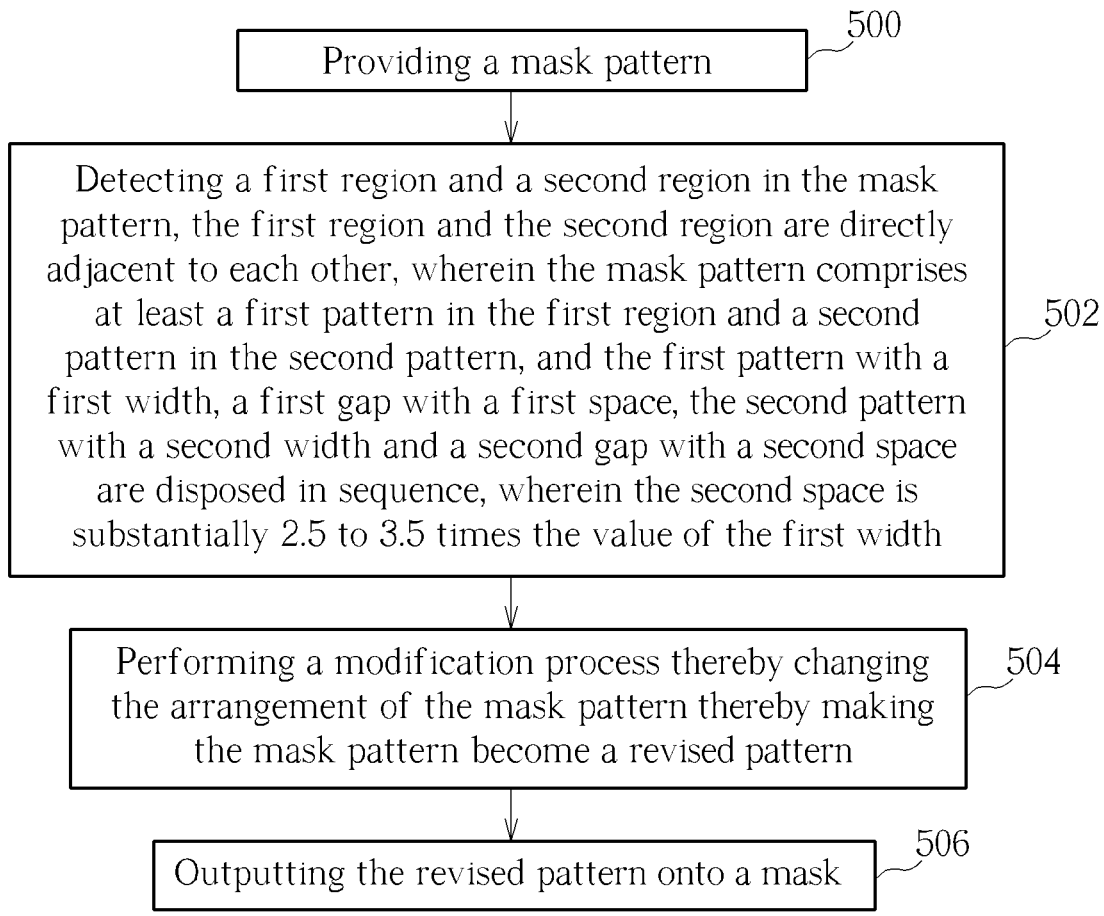
FIG. 8 shows a flow chart of the OPC method of the present invention.

Please refer to FIG. 8, which shows a flow chart of the method of OPC of the present invention. As shown in FIG. 8, the OPC in the present invention contains the following steps:

Step 500: Providing a mask pattern;

Step 502: Detecting a first region and a second region in the mask pattern, wherein the first region and the second region are adjacent to each other, and wherein the mask pattern comprises at least a first pattern in the first region and a second pattern in the second pattern. The first pattern with a first width, a first gap with a first space, the second pattern with a second width and a second gap with a second space are disposed in sequence, wherein the second space value is substantially 2.5 to 3.5 times the value of the first width;

Step 504: performing a modification process for changing the arrangement of the mask pattern, thereby making the mask pattern become a revised pattern;

Step 506: outputting the revised pattern onto a mask.

In summary, the present invention provides an OPC method that avoids the peeling problem resulting from light diffraction. By the modification that changes the arrangement of the mask pattern, the second space is not 2.5 to 3.5 times the value of the first width anymore, so the light diffraction phenomenon from the second gap can be prevented.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical proximity correction (OPC) method, comprising:

providing a mask pattern;

detecting a first region and a second region in the mask pattern by using a computer, wherein the first region and the second region are adjacent to each other, the mask pattern comprises at least a first pattern in the first region and a second pattern in the second region, and the first pattern with a first width, a first gap with a first space, the second pattern with a second width and a second gap with a second space are disposed in sequence, wherein the second space is substantially 2.5 to 3.5 times of the first width;

performing a modification process for changing the arrangement of the mask pattern and making the mask pattern become a revised pattern so the first pattern is not influenced by light passing through the second gap during an exposure process; and outputting the revised pattern onto a mask.

2. The optical proximity correction method according to claim 1, wherein the mask pattern comprises a plurality of first patterns in the first region, wherein a first gap is disposed between every two first patterns such that the first patterns and the first gaps are arranged alternatively.

3. The optical proximity correction method according to claim 1, wherein there is no other pattern between the first pattern and the second pattern.

4. The optical proximity correction method according to claim 1, wherein before the modification process, the first width is substantially equal to the first space.

5. The optical proximity correction method according to claim 1, wherein before the modification process, the first width is substantially 90 nm.

6. The optical proximity correction method according to claim 1, wherein before the modification process, the second width is substantially between 280 and 320 nm.

7. The optical proximity correction method according to claim 1, wherein the modification process includes increasing the second space.

8. The optical proximity correction method according to claim 1, wherein the modification process includes reducing the second space.

9. The optical proximity correction method according to claim 1, wherein the modification process includes increasing the first width.

10. The optical proximity correction method according to claim 1, wherein the modification process includes moving the first pattern toward the second region.

* * * * *